2 Sheets—Sheet 1.

L. MILLER.
Grain-Binder.

No. 198,899. Patented Jan. 1, 1878.

Witnesses.
D. R. Cowl
Edmund Masson

Inventor.
Lewis Miller,
By Atty A. B. Stoughton.

2 Sheets—Sheet 2.

L. MILLER.
Grain-Binder.

No. 198,899. Patented Jan. 1, 1878.

Witnesses.
D. R. Cowl
Edmund Masson

Inventor.
Lewis Miller,
By Atty A. B. Stoughton.

UNITED STATES PATENT OFFICE.

LEWIS MILLER, OF AKRON, OHIO.

IMPROVEMENT IN GRAIN-BINDERS.

Specification forming part of Letters Patent No. 198,899, dated January 1, 1878; application filed April 28, 1875.

*To all whom it may concern:*

Be it known that I, LEWIS MILLER, of Akron, in the county of Summit and State of Ohio, have invented certain new and useful Improvements in Self-Binders for Harvesting-Machines; and I do hereby declare the following to be a full, clear, and exact description of the same, reference being had to the accompanying drawings, making a part of this specification, in which—

Figure 1:
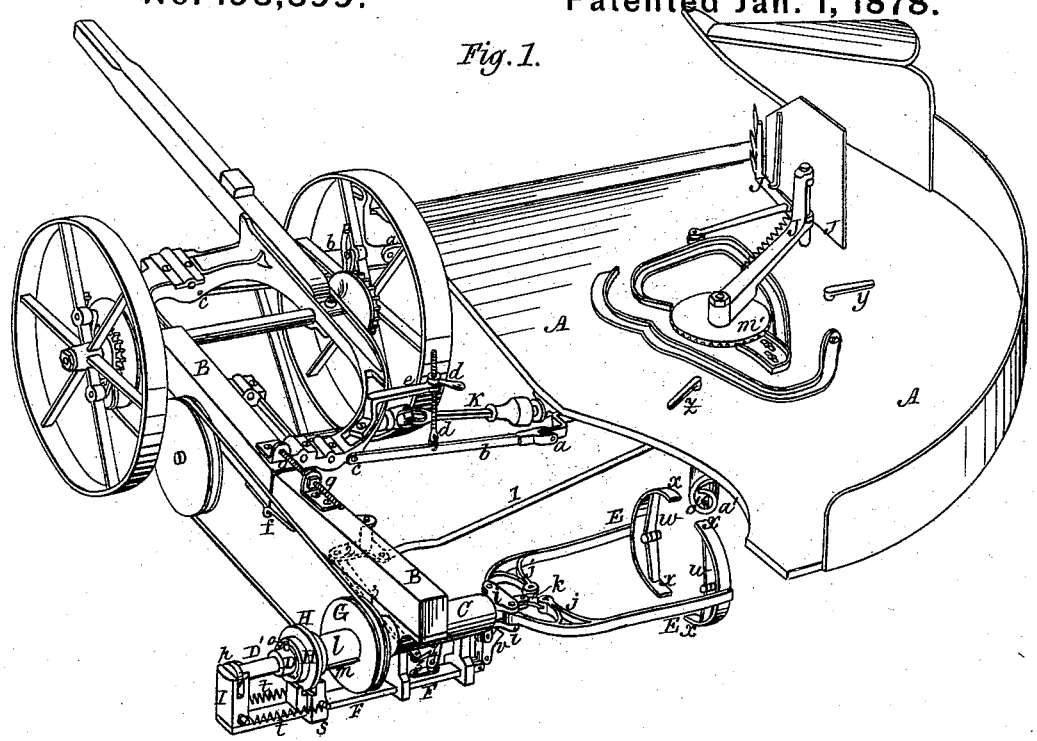
Figure 2:
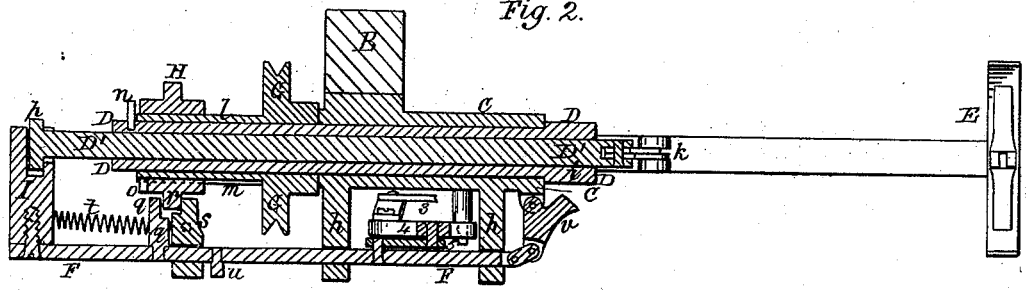
Figure 3:
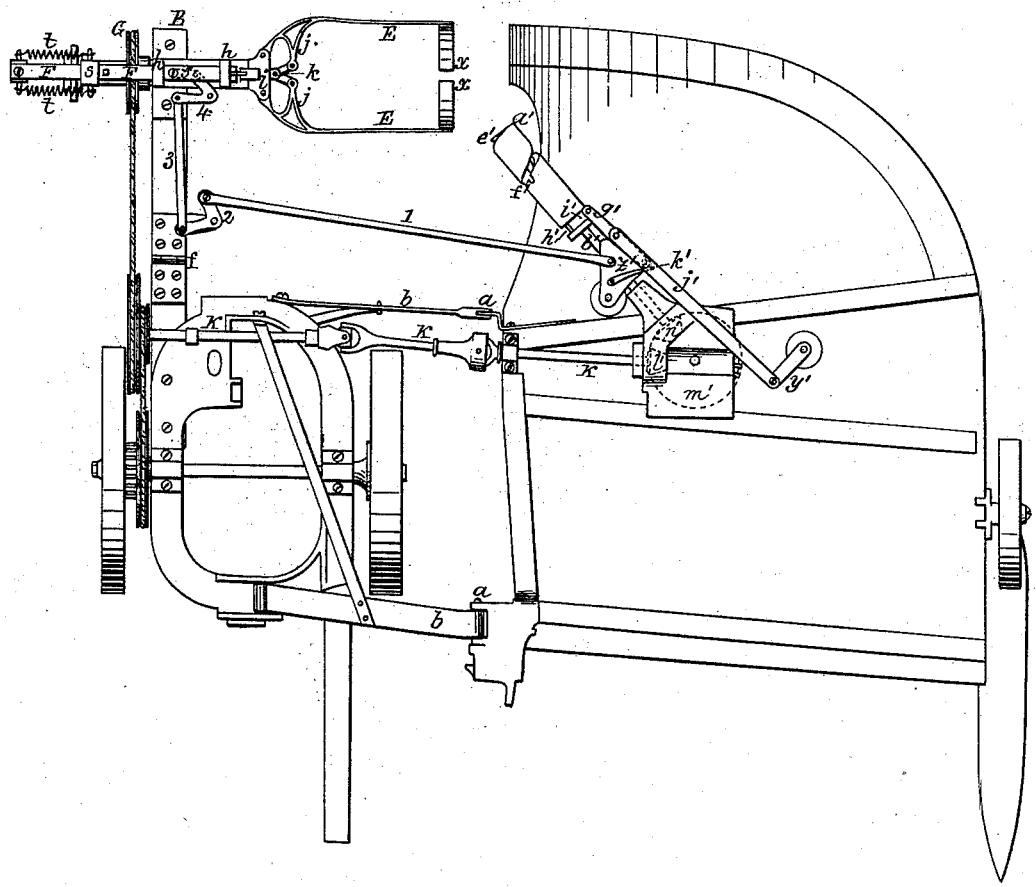
Figure 4:
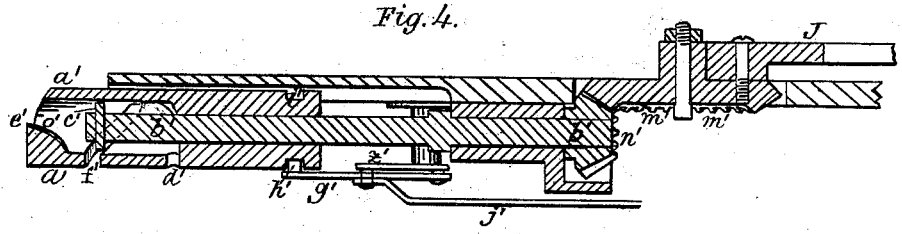

Figure 1 represents, in perspective, so much of a harvesting-machine as will illustrate the application of the self-binding mechanism thereto, and showing said binding mechanism in working position. Fig. 2 represents a vertical longitudinal section through the clamp holding and operating mechanism, as also through the clamp and its shaft. Fig. 3 represents a view or plan of the under side of the harvesting-machine and platform, and shows the binding mechanism connected therewith. Fig. 4 represents a longitudinal section through the twister and its driving mechanism, as also its relation to and co-operation with the rake that gathers and delivers the gavel to be bound to the revolving clamp.

My invention relates to the several mechanisms by or through which the grain that is cut and has fallen upon the platform is taken by a rake, compressed into a gavel, delivered into or between the jaws of revolving tongs or clamps, bound up into a bundle by its own straw, and delivered upon the ground.

My invention consists, first, in the location or arrangement of the tongs—viz., in a line with the joints or hinges upon which the platform is hung—so that said tongs may always maintain their relative working position in relation to a rising and falling platform.

It further consists in the arrangement of the receiving-tongs upon the frame of the machine, and a sweep-rake upon the hinged platform, so as to receive the gavel at right angles, or thereabout, to the line in which the grain falls upon the platform.

It further consists in the combination of the toggles, arranged in front of the bearing of and with the tongs-holding and driving shaft, for the purpose of opening and closing the jaws of the tongs at stated intervals.

It further consists in the combination of the peculiar clutch mechanism with the tongs, by which the latter is rotated at intervals.

It further consists in the combination of a clamp or stop with the tongs, by which the latter is stopped and held in proper position to receive the gavel delivered to it by the sweep-rake.

It further consists in the combination of the hinge and take-up in and on the beam that carries the tongs and tongs-operating mechanism with the hinged and adjustable platform, so that when the latter is raised or lowered the former can be correspondingly raised, lowered, or adjusted thereto.

It further consists in the combination of the clutch mechanism with the tongs-operating mechanism and the sweep-rake, so that the latter, when it has delivered the gavel to the tongs, will start the tongs-driving gear and the twister, and again throw them out of action when the bundle is bound.

To enable others skilled in the art to make and use my invention, I will now describe the same with reference to the drawings.

The main frame and the main running and driving gear are shown in the drawings, and need no detailed description.

The platform A is hinged at *a a* to coupling-arms *b b*, that are hinged to the front and rear, respectively, of the main frame at the points *c c;* and the working-height of the platform above the ground is regulated by a screw-rod and hand-nut, *d*, which suspends the rear coupling-arm to a rigid arm, *e*, attached to the main frame through the intervention of a link-connection, so that the platform may rise above, but cannot descend below, the height at which it is adjusted to work.

To the main frame there is attached a beam, B, which projects rearward, and has in or on it a hinged joint, *f*, and a regulating-screw, *g*, spanning said joint, so that the rear end of said beam, and the mechanism which it supports and carries, may be adjusted to conform to the adjustment of the platform. On the rear end of this beam B there is secured a sleeve, boss, or frame, C, through which passes a second movable sleeve, D, and through this second sleeve passes the shaft D', which, together with the sleeve D, carries, opens and closes, and revolves the tongs E, as will be explained hereinafter.

There are attached to the hollow frame $c$, which is rigid, two down-hangers, $h\ h$, which support a bar, F, that is caused to slide back and forth in putting the tongs into or out of action, as the case may be.

The arms of the tongs E, at their rear ends, are pivoted to the head $i$, which head is fast on or a part of the sleeve D; and at or near said rear ends of the arms of the tongs are arms $j\ j$, curving inward and toward each other, to which are pivoted, respectively, the ends of a pair of toggle-levers, $k$, the opposite ends of which are pivoted to the end of the through-shaft $D'$, so that by this toggle-connection of the rake-arms to the shaft $D'$, and their pivoted connection to the sleeve, said shaft and sleeve are united for the purposes of rotation, and the shaft can be moved longitudinally through the sleeve to open and close the jaws of the tongs.

Over the left-hand end of the sleeve D is slipped a pulley, G, which has a long hollow hub, $l$, on it, upon which hub there is a spline or feather, $m$, and over or upon this hub is placed a clutch-rim, H, having a groove in it to take in the spline $m$, so as to cause both to rotate together, while the clutch-rim has a longitudinal motion upon and independent of the pulley and its hub.

A stud, $n$, is placed in the sleeve D, and there is a notch, $o$, in the rim of the clutch-piece H, which notch, when it slides up and takes in said pin, causes the pulley G, hub $l$, clutch-rim H, and shaft $D'$, all to rotate together.

Upon the end of the sliding bar F there is a rigid upright post, I, in a groove in the top of which the head $p$ of the shaft $D'$ is placed, so that when the sliding bar F, and consequently its post I, is moved, the shaft $D'$ is also moved by it, to open and close the jaws of the tongs E.

On the bar F there is a permanent stud or stop, $q$, which catches against the rim $r$ on the clutch-piece H, and moves said clutch-piece upon the hub $l$ of the pulley G in one direction; and upon the bar F there is a sliding piece, $s$, controlled by reactionary springs $t$, which piece $s$ bears upon the opposite side of the rim $r$ of the clutch-piece H, and holds or moves said clutch-piece in the opposite direction, so that in whichever direction the bar F is moved the clutch-piece H moves in the same direction. A stop, $u$, in the bar F defines the distance that the sliding piece $s$ can move on said bar. To that end of the bar F next to the tongs E there is pivoted a locking-piece, $v$, which, when the shaft $D'$ is moved so as to open the tongs for the reception of the gavel to be seized and bound, and to stop the rotation of the tongs, comes against the head $i$ of the sleeve D, and stops and holds the open tongs in the proper position for receiving the gavel.

In the jaws of the tongs are hinged pieces $w$, which, when the pressure of the straw comes against them, tend to draw the extremities $x$ of said jaws more tightly against the gavel, to press it into small compass and firmly hold it while being rotated and bound.

The automatic throwing into and out of action of the tongs, and at the proper intervals, is accomplished as follows: Upon the platform A, and in the path of the sweep-rake J working thereon, are two small levers, $y\ z$, which are connected, both of them, as seen in Fig. 3, with a rod, 1, attached to one end or arm of a bell-crank, 2, the other arm being attached by a rod, 3, to an arm of the bell-crank 4, and the other arm of the bell-crank 4 is attached to the sliding bar F through a link or pivoted piece, 5. Thus when the rake or its arm strikes and moves the lever $y$ it causes, through its several connections, the shaft $D'$ to move and open and set the tongs for the reception of the gavel, which the rake is bringing around and about to deposit in the tongs; and when the rake reaches and moves the lever or crank-arm $z$, which it does immediately after depositing the gavel in the tongs, several operations follow, viz: It closes the jaws of the tongs upon the gavel; the tongs and gavel commence to revolve upon or with their shaft $D'$; the twister $a'$ is moved outward upon its shaft $b'$ toward the revolving gavel, and is clutched to or with said shaft by means of a pin, $c'$, taking into a slot or notch, $d'$, in the twister $a'$, so that the latter commences its rotation; and, by means of its point $e'$ and the spiral slot $f'$, it takes up small tufts of the straw, and, twisting them together, weaves a band around the bundle, the end of which band or twisted straws, after passing one or more times around the bundle, is tucked into the bundle to hold said end. (The tucking device is not shown, but may be of any of the usual well-known kinds.)

The crank-arms $y'$ and $z'$, Fig. 4, underneath the platform, are fast to and move with their respective mates or fellows $y$ and $z$ on the upper side of the platform. The rod 1 is pivoted to the crank-arm $z'$, and said rod is connected to the sliding bar F through the mechanism hereinbefore described to move said bar; and to this crank-arm $z'$ is also pivoted one end of a bar, $g'$, the other end thereof having a yoke, $h'$, upon it, which sits loosely in the groove $i'$ in the rear end of the twister $a'$, so that when said crank $z'$ is moved in one direction it moves the twister outward upon its shaft $b'$ until the pin $c'$ takes into the slot or notch $d'$ in the twister, when both shaft and twister revolve together, the shaft $b'$ having a continuous rotation when the machine is working. The reverse movement of the crank $z'$ draws back the twister, and, disconnecting it from the shaft $b'$, the former remains stationary until again set in motion by the rake on its next round and next delivery of the gavel. To the other crank, $y'$, there is attached one end of a connecting-bar, $j'$, the other end of which is pivoted to the bar $g'$, so that for their special uses and purposes the two cranks $z'$ and $y'$ are connected, each, however, for its special purpose, and at its stated period in the operation. The bar $g'$ is slotted where it is connected to the crank $z'$, so as to have some lost motion, and behind it there is a spring, $k'$, to hold it up against its pivot and ease its operation.

The rake is driven from the main drive-wheels by either belt and pulley or fixed gear, through a jointed shaft, K, upon the end of which, underneath the platform, there is a bevel-gear, $l'$, that runs two other bevel-gears—viz., one, $m'$, that revolves the rake J, and the other, $n'$, that revolves the shaft $b'$ that carries and operates the twister $a'$. In the interior of the twister, and at or near its end, is attached a permanent projecting piece, $o'$, which is designed for preventing the tufts of straw picked up by the twister from running too far into the spiral slot of the twister, where they would clog.

It will be perceived that the jaws of the tongs are in, or practically in, the line of the hinged joints $a\ a$, by which the platform is hinged and connected to or with the coupling-arms $b$ and the main frame, so that, however much the platform may rise or fall in passing over the inequalities of the ground, the tongs maintain an uniformly-relative position with the platform, so as always to receive the gavel brought around over the platform by the sweep-rake; and it is further to be noticed that the toggle-connection between the tongs and the shaft that carries, supports, opens and closes, and revolves said tongs is forward of its (the shaft's) bearing in the hollow shaft D, so that there is nothing to interfere with its certain operation.

Having thus fully described my invention, what I claim is—

1. The arrangement of the tongs E in relation to the platform A, so that the jaws $x$ of the tongs and the hinged connections $a\ a$ of the platform shall be substantially in the same line, and the tongs in position to receive the gavel from the platform, however much the latter may rise and fall in passing over the undulations of the ground.

2. The arrangement of the receiving-tongs E upon the frame of the machine, and the sweep-rake J, arranged upon the hinged platform A, to operate in combination, substantially as described, for the purpose specified.

3. The tongs E, pivoted to the head of the sleeve D, and the toggles $k$, pivoted to the tongs and the head of the sliding shaft D', substantially as described, for the purpose specified.

4. In combination with the tongs E and the shafts D D', toggles $k$, the pulley G and its hub $l$, the sliding clutch-piece H, and pin $n$, and recess $o_r$ for the purpose of connecting and revolving and disconnecting the tongs at intervals, as and for the purpose described.

5. In combination with the tongs E, the stop or brace $v$, automatically operated for holding the tongs in proper position to receive the gavel, and for releasing the tongs when it is to be revolved for the purpose of being bound, as described.

6. In combination with the beam B, that carries the tongs and tongs-operating mechanism, the hinge $f$ and take-up $g$, for the purpose of adjusting the tongs to the height of the platform, as and for the purpose described.

7. In combination with the sweep-rake and the cranks $y\ z$, which it moves in its circuit, the tongs E and the twister $a'$, and the connecting mechanism for operating said tongs and twister, as and for the purpose described and represented.

LEWIS MILLER.

Witnesses:
N. N. LEOHNER,
L. H. HANSCOM.